(12) United States Patent
Kang et al.

(10) Patent No.: US 12,117,095 B2
(45) Date of Patent: Oct. 15, 2024

(54) VALVE ACTUATOR

(71) Applicant: LG ELECTRONICS INC., Seoul (KR)

(72) Inventors: Joohang Kang, Seoul (KR); Youngchan Ahn, Seoul (KR); Deokkyu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/872,710

(22) Filed: Jul. 25, 2022

(65) Prior Publication Data

US 2023/0053986 A1 Feb. 23, 2023

(30) Foreign Application Priority Data

Aug. 19, 2021 (KR) .................. 10-2021-0109673

(51) Int. Cl.
*F16K 31/04* (2006.01)
*F16K 31/524* (2006.01)

(52) U.S. Cl.
CPC ...... *F16K 31/52425* (2013.01); *F16K 31/048* (2013.01)

(58) Field of Classification Search
CPC ...... F16K 31/04; F16K 31/047; F16K 31/048; F16K 31/53; F16K 31/524; F16K 31/52425; H02K 7/116
See application file for complete search history.

(56) References Cited

U.S. PATENT DOCUMENTS

| | | | | |
|---|---|---|---|---|
| 10,161,539 B1 * | 12/2018 | Lin | ..................... | F16K 5/02 |
| 10,180,181 B2 * | 1/2019 | Cao | ................... | F02M 26/54 |
| 2014/0311464 A1 | 10/2014 | Sano et al. | | |
| 2016/0138533 A1 | 5/2016 | Martin et al. | | |
| 2019/0309873 A1 * | 10/2019 | Robbins | ................ | F16K 31/535 |

FOREIGN PATENT DOCUMENTS

| | | |
|---|---|---|
| GB | 1397530 | 6/1975 |
| KR | 10-0315191 | 11/2001 |
| KR | 10-0462831 | 12/2004 |
| KR | 10-0815162 | 3/2008 |
| KR | 100932385 | 12/2009 |
| KR | 10-2016-0088935 | 7/2016 |
| KR | 10-2018-0134460 | 12/2018 |

OTHER PUBLICATIONS

Extended European Search Report in European Appln. No. 22186170.1, dated Jan. 3, 2023, 8 pages.
Notice of Allowance in Korean Appln. No. 10-2021-0109673, mailed on Oct. 3, 2023, 4 pages (with English translation).

* cited by examiner

*Primary Examiner* — Matthew W Jellett
(74) *Attorney, Agent, or Firm* — Fish & Richardson P.C.

(57) ABSTRACT

A valve actuator includes a motor and a gear assembly including an input gear rotated by driving force of the motor, an output gear receiving rotational force of the input gear, and at least one power transmission gear transmitting the rotational force of the input gear to the output gear. The valve actuator further includes a valve output shaft actuated to close a path of a valve, and a selective power transmitter selectively transmitting the rotational force of the output gear to the valve output shaft. The selective power transmitter includes a cam portion provided in at least one of the output gear and the valve output shaft. Accordingly, after the valve is actuated to close the path, the driving force of the motor is not transmitted to the valve output shaft.

18 Claims, 8 Drawing Sheets

VALVE ACTUATOR

CROSS-REFERENCE TO RELATED APPLICATION

This application claims priority to and the benefit of Korean Patent Application No. 10-2021-0109673, filed in the Korean Intellectual Property Office, on Aug. 19, 2021, the entire contents of which are incorporated herein by reference.

BACKGROUND OF THE INVENTION

Field of the Invention

The present disclosure relates to a valve actuator for automatically opening/closing a valve, and more particularly, to a valve actuator having an over-torque interruption function.

Description of Related Art

Refrigerant is essentially used in an air conditioner which is one of the air conditioning devices, and Freon gas used as the refrigerant acts as a factor of global warming.

Therefore, in recent years, refrigerant has been developed, which is not concerned with the global warming, and the newly developed refrigerant does not act as the factor of the global warming, but there is a risk of a fire in the case of refrigerant leakage due to an ignition propensity, and as a result, a valve actuator for automatically actuating a valve for interrupting leakage in the case of the refrigerant leakage has been developed.

As a valve installed between an outdoor unit and an indoor unit of the air conditioner and preventing the refrigerant leakage, a ball valve is primarily used, and as illustrated in FIG. 1, a ball valve 10 includes a ball 11 with a path, a pipe 12 into which the ball 11 is inserted, a stem 13 connected to the pipe 12, a seal member 14 installed in the stem 13, and a stem fixation bolt 15.

A valve actuator for controlling the ball valve having such a configuration generally includes a motor and a gear assembly, and controls the valve by controlling rotation of the motor by using a sensor such as a limit switch, etc., or controlling the rotation of the motor by using a step motor.

As an example, Korean Patent Application No. 10-2007-0141333 (hereinafter, referred to as "prior patent") discloses a valve actuator configured in such a manner that when a projection portion of an output gear connected to the stem of the ball valve among a plurality of gears provided in the gear assembly rotates at 90 degrees or more, an electronic limit switch is pressed to stop the motor.

However, the valve actuator of the prior patent having the electronic limit switch has a problem in that sensors' peculiar instability in a harsh environment.

PRIOR ART DOCUMENT

Korean Patent Application No. 10-2007-0141333

SUMMARY OF THE INVENTION

The present disclosure provides a valve actuator capable of securing durability and driving stability.

The present disclosure also provides a valve actuator removing instability of an electronic sensor.

The present disclosure also provides a valve actuator which need not include a separate PCB for a motor stop signal.

The objects of the present disclosure are not limited to the above-mentioned objects, and other objects and advantages of the present disclosure that are not mentioned can be understood by the following description, and will be more clearly understood by embodiments of the present disclosure.

Further, it will be readily appreciated that the objects and advantages of the present disclosure can be realized by means and combinations shown in the claims.

A valve actuator according to an exemplary embodiment of the present disclosure includes: a motor; a gear assembly including an input gear rotated by driving force of the motor, an output gear receiving rotational force of the input gear, and at least one power transmission gear transmitting the rotational force of the input gear to the output gear; a valve output shaft actuated to close a path of a valve; and a selective power transmitter selectively transmitting the rotational force of the output gear to the valve output shaft, and the selective power transmitter includes a cam portion provided in at least one of the output gear and the valve output shaft.

In one aspect, the cam portion is provided in each of the output gear and the valve output shaft.

The output gear further includes a tooth portion positioned to be higher than the cam portion provided in the output gear, a height difference between the cam portion and the tooth portion is formed to be equal to or larger than a thickness of the cam portion, and a thickness of the valve output shaft is formed to equal to the thickness of the cam portion provided in the output gear or smaller than the thickness of the cam portion of the output gear.

The valve actuator further comprises a case in which the motor, the gear assembly and the valve output shaft are installed.

The motor is installed outside the case, and the gear assembly and the valve output shaft are installed inside the case.

The power transmission gear includes a first gear coupled to the input gear, a second gear coupled to the first gear, and a third gear coupled to each of the second gear and the output gear.

The first gear includes a first tooth portion coupled to a tooth portion of the input gear and a second tooth portion positioned at a lower side of the first tooth portion of the first gear, the second gear includes a first tooth portion coupled to the second tooth portion of the first gear, and a second tooth portion positioned at an upper side of the first tooth portion of the second gear, and the third gear includes a first tooth portion coupled to the second tooth portion of the second gear, and a second tooth portion positioned at the lower side of the first tooth portion of the third gear and coupled to the tooth portion of the output gear.

The tooth portion of the output gear and the cam portion provided in the output gear are positioned in opposite directions based on a shaft of the output gear.

In another aspect, the cam portion is provided in any one of the output gear and the valve output shaft, and a groove portion coupled to the cam portion is provided in the other one of the output gear and the valve output shaft.

The output gear further includes a tooth portion positioned to be higher than the cam portion or the groove portion provided in the output gear, a height difference between the cam portion or the groove portion and the tooth portion is formed to be equal to or larger than a thickness of the cam portion or the groove portion, and a thickness of the valve output shaft is formed to equal to the thickness of the cam portion or the groove portion provided in the output gear or smaller than the thickness of the cam portion or the groove portion of the output gear.

The valve actuator further comprises a case in which the motor, the gear assembly and the valve output shaft are installed.

The motor is installed outside the case, and the gear assembly and the valve output shaft are installed inside the case.

The power transmission gear includes a first gear coupled to the input gear, a second gear coupled to the first gear, and a third gear coupled to each of the second gear and the output gear.

The first gear includes a first tooth portion coupled to the tooth portion of the input gear and a second tooth portion positioned at a lower side of the first tooth portion of the first gear, the second gear includes a first tooth portion coupled to the second tooth portion of the first gear and a second tooth portion positioned at an upper side of the first tooth portion of the second gear, and the third gear includes a first tooth portion coupled to the second tooth portion of the second gear and a second tooth portion positioned at the lower side of the first tooth portion of the third gear and coupled to the tooth portion of the output gear.

The tooth portion of the output gear and the cam portion or the groove portion provided in the output gear are positioned in opposite directions based on a shaft of the output gear.

According to the present disclosure, driving force of a motor is transmitted to a valve output shaft through a gear assembly and a valve is closed, and then the driving force of the motor is not transmitted to the valve output shaft by the selective power transmitter to prevent damage to the gear assembly and/or the motor due to over-torque and apply a motor of a type in which an RPM control is inaccurate.

In addition, since the electronic sensor is not used, the instability of the electronic sensor can be removed, and a separate PCB for a motor stop signal need not be provided, thereby increasing durability, and improving complexity and material cost.

In addition to the above-described effects, the specific effects of the present disclosure will be described below together while describing the specific matters for the present disclosure.

DETAILED DESCRIPTION OF THE EMBODIMENTS

Figure 1:
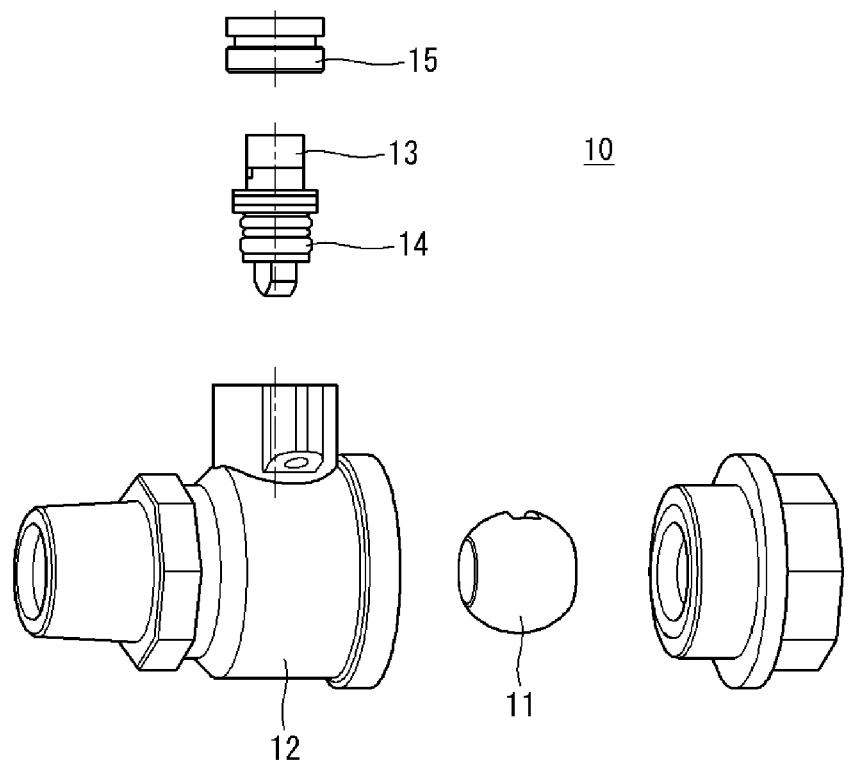
FIG. 1 is an exploded perspective view illustrating a configuration of a general ball valve.

The present disclosure will be described more fully hereinafter with reference to the accompanying drawings, in which exemplary embodiments of the invention are shown. The present disclosure can be realized in various different forms, and is not limited to the exemplary embodiments described herein.

A part irrelevant to the description will be omitted to clearly describe the present disclosure, and the same elements will be designated by the same reference numerals throughout the specification. Further, some exemplary embodiments of the present disclosure will be described in detail with reference to illustrative drawings.

When reference numerals refer to components of each drawing, although the same components are illustrated in different drawings, the same components are denoted by the same reference numerals as possible. Further, in describing the present disclosure, a detailed description of known related configurations and functions may be omitted to avoid unnecessarily obscuring the subject matter of the present disclosure.

In describing the component of the present disclosure, when it is disclosed that any component is "connected", "coupled", or "linked" to other components, it should be understood that another component may be "interposed" between respective components or the respective components may be "connected", "coupled", or "linked" through another component.

Figure 2:
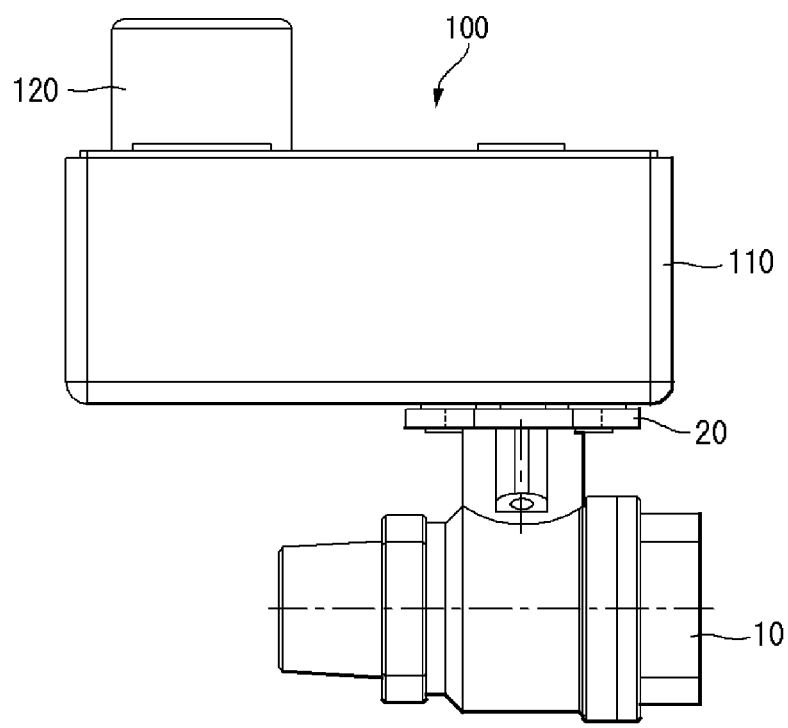
FIG. 2 is a diagram illustrating a coupling state of a valve actuator and a ball valve according to an exemplary embodiment of the present disclosure.
Figure 3:
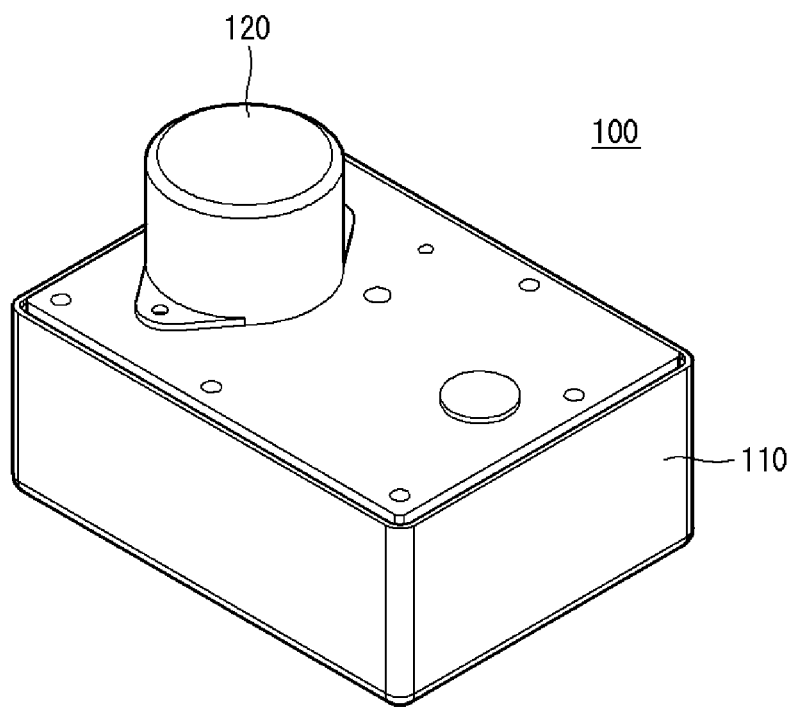
FIG. 3 is an exterior perspective view of the valve actuator illustrated in FIG. 2.

FIG. 2 is a diagram illustrating a coupling state of a valve actuator and a ball valve according to an exemplary embodiment of the present disclosure and FIG. 3 is an exterior perspective view of the valve actuator illustrated in FIG. 2.

As illustrated, in order to install the valve actuator 100 in the ball valve 10, a plate 20 may be installed above the ball valve 10, and the valve actuator 100 may be coupled to the plate 20.

The plate 20 may be fixed to an upper end of the ball valve 10 by a fastening member such as a fastening screw, etc., and the valve actuator 100 may be fixed to the plate 20 by the fastening member such as the fastening screw, etc.

The valve actuator 100 includes a case 110.

The case 110 provides a space in which a motor 120 and a gear assembly provided in the valve actuator 100 are installed, the motor 120 is installed on an upper surface of the case 110 outside the case 110, and the gear assembly is disposed in an internal space of the case 110.

The motor 120 may be a motor of a type in which RPM control is accurate. However, this is not required, and the motor 120 may be a motor of a type in which the RPM control is inaccurate. That is, since the valve actuator according to the exemplary embodiment of the present disclosure may selectively transmit power by a mechanical structure, damage to the gear assembly may be prevented and the ball valve may be accurately controlled while using the motor of the type in which the RPM control is inaccurate.

Figure 4:
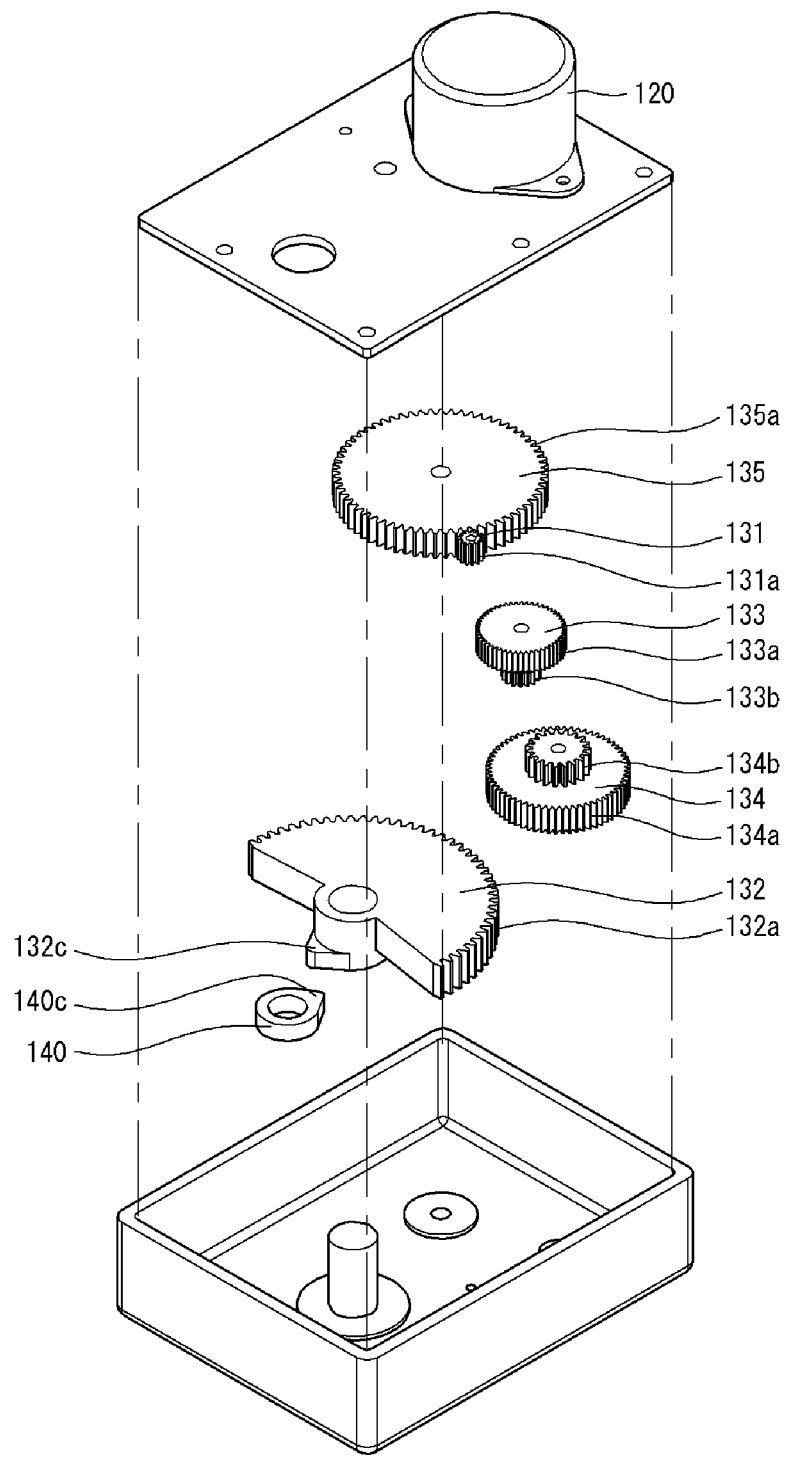
FIG. 4 is an exploded perspective view of the valve actuator illustrated in FIG. 3.
Figure 5:
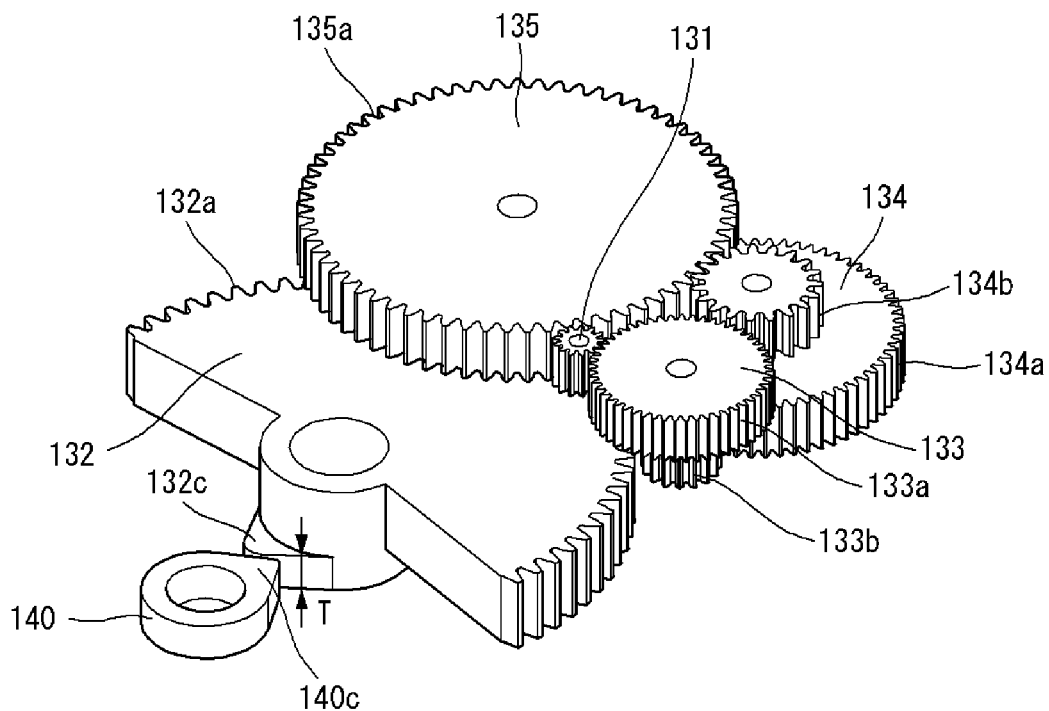
FIG. 5 is a perspective view illustrating a coupling state of a gear assembly illustrated in FIG. 4.
Figure 6:
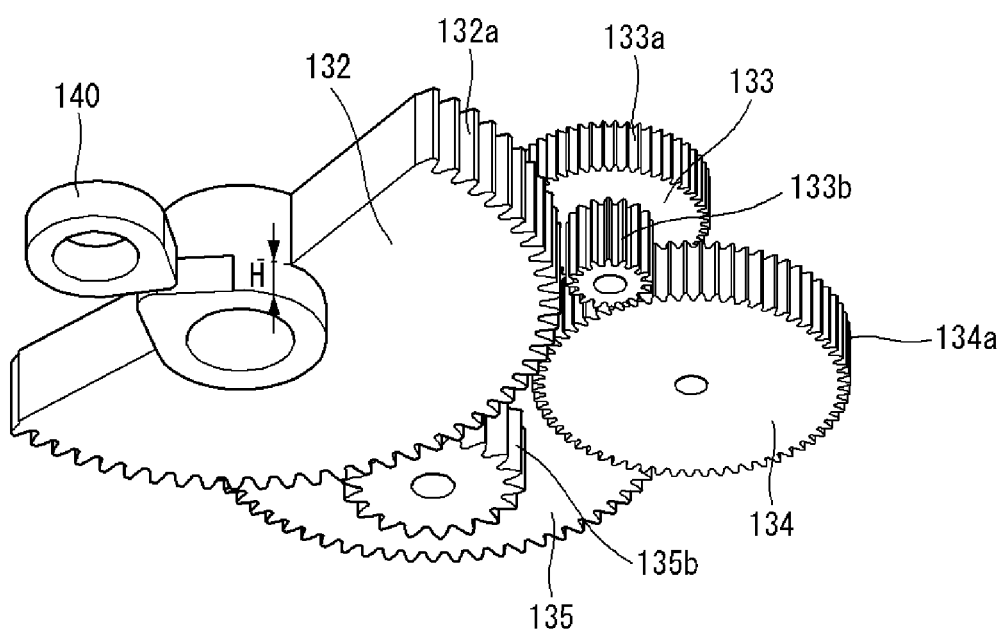
FIG. 6 is a bottom perspective view of the gear assembly illustrated in FIG. 5.

FIG. 4 is an exploded perspective view of the valve actuator illustrated in FIG. 3, FIG. 5 is a perspective view illustrating a coupling state of a gear assembly illustrated in FIG. 4, and FIG. 6 is a bottom perspective view of the gear assembly illustrated in FIG. 5.

Figure 7:
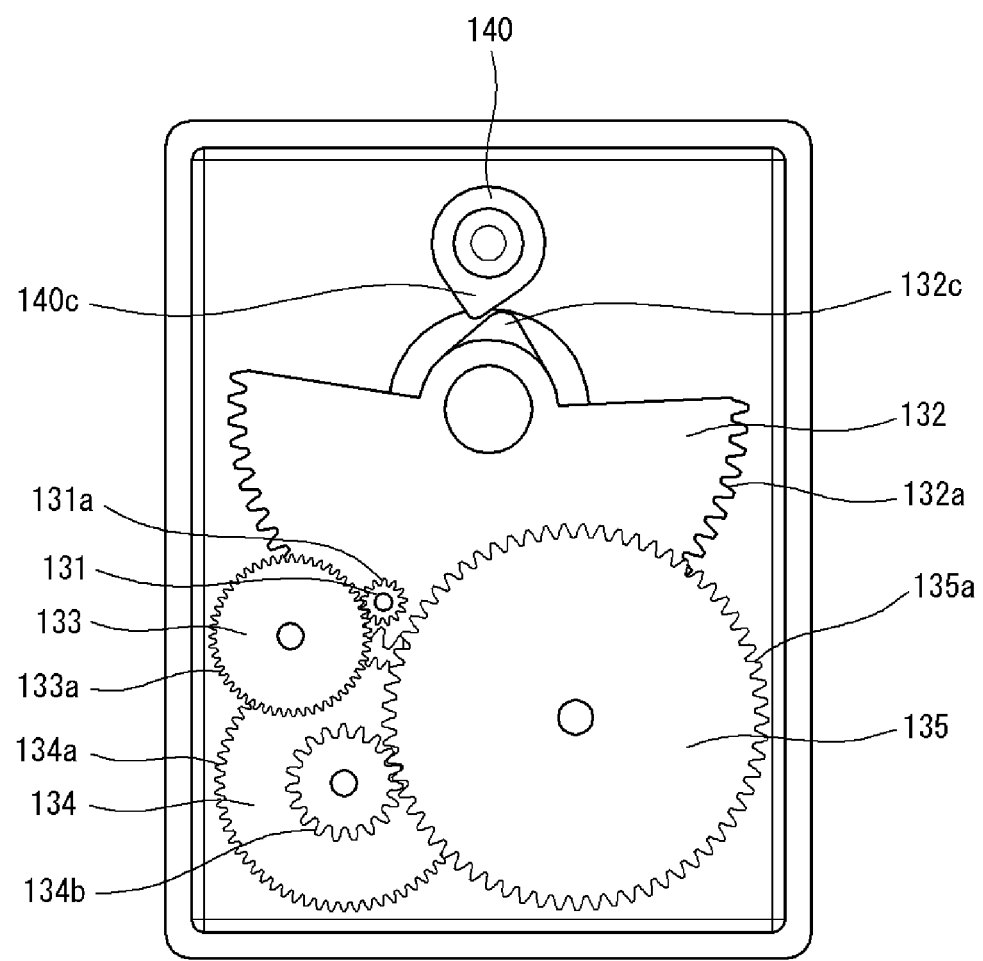
FIGS. 7 and 8 are diagrams illustrating an actuation state of the valve actuator.
Figure 8:
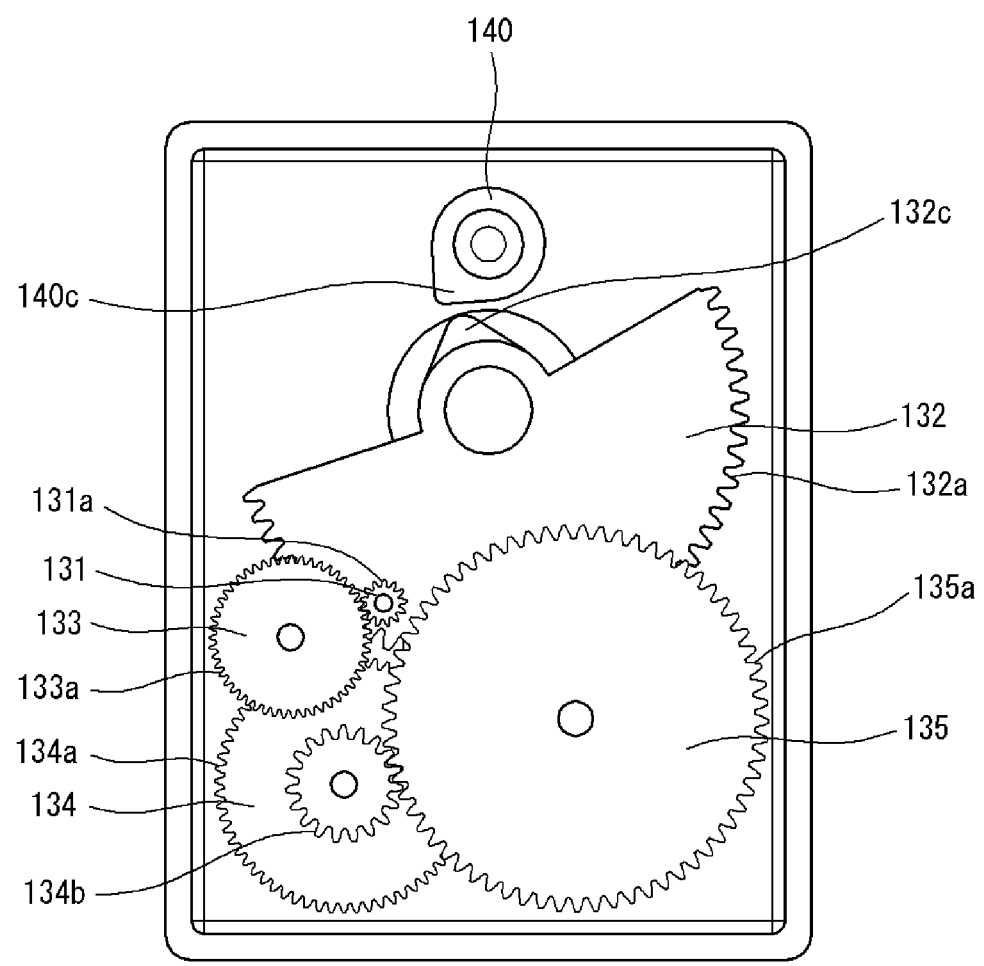
Figure 9:
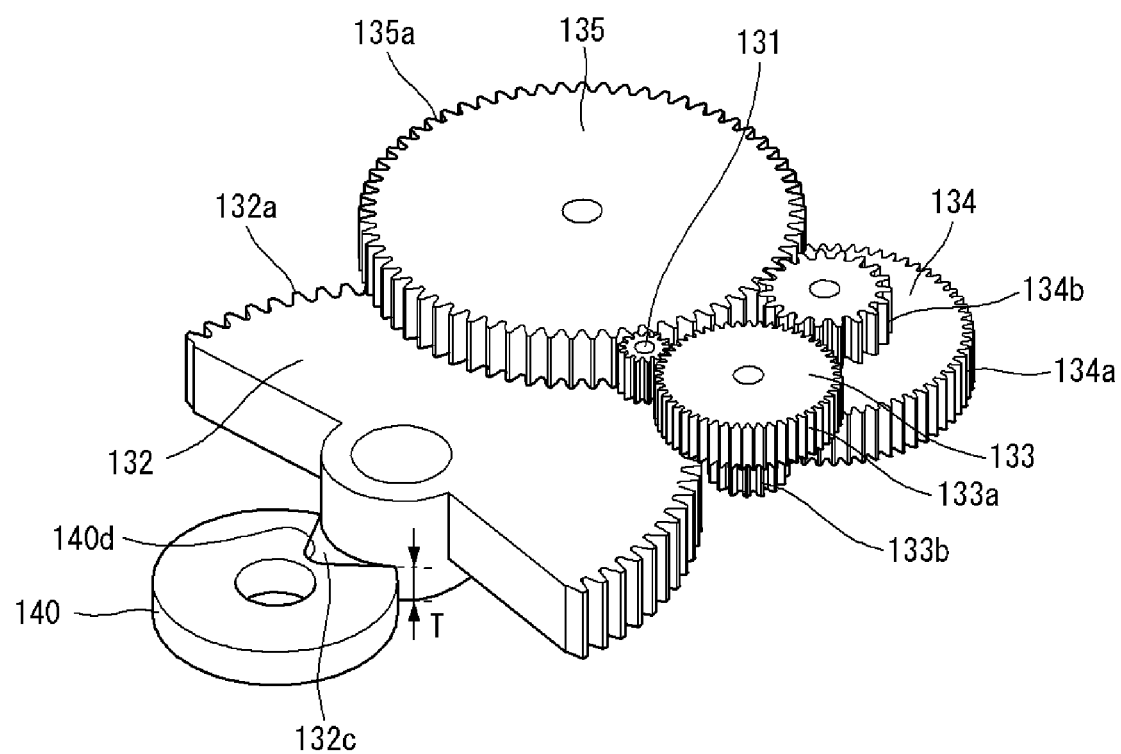
FIG. 9 is a perspective view illustrating a coupling state of a gear assembly according to another exemplary embodiment of the present disclosure.

In addition, FIGS. 7 and 8 are diagrams illustrating an actuation state of the valve actuator, and FIG. 7 is a diagram illustrating a cam engagement state within a normal actuation range and FIG. 8 is a diagram illustrating a state in which cam engagement is released.

As illustrated, the gear assembly includes an input gear 131 coupled and/or connected to a rotational shaft of the motor 120 and receiving the driving force of the motor 120, an output gear 132 coupled to a valve output shaft 140 and transmitting rotational force of the input gear 131 to the valve output shaft 140, and at least one power transmission gear transmitting the rotational force of the input gear 131 to the output gear 132.

Hereinafter, it will be described as an example that the power transmission gear is constituted by first to third gears, but the number of power transmission gears may be appropriately changed.

In addition, in the exemplary embodiment, while the rotational force of the input gear is transmitted to the output gear through the power transmission gear, a speed is reduced by the gear assembly or the power transmission gear.

The input gear 131 includes a tooth portion 131a.

A first gear 133 coupled to the input gear 131 includes a first tooth portion 133a physically directly coupled to the toot portion 131a of the input gear 131 and a second tooth portion 133b disposed below the first tooth portion 133a on an axis of the first gear 133.

A first tooth portion 134a of a second gear 134 is physically directly coupled to the second tooth portion 133b of the first gear 133, and the second tooth portion 134b is positioned above the first tooth portion 134a on the axis of the second gear 134.

In addition, a third gear 135 includes a first tooth portion 135a physically directly coupled to the second tooth portion 134b of the second gear 134, and a second tooth portion 135b positioned below the first tooth portion 135a on the axis of the third gear 135.

In addition, a tooth portion 132a of the output gear 132 is physically directly coupled to the second tooth portion 135b of the third gear 135, and the output gear 132 further includes a cam portion 132c positioned in an opposite direction to the tooth portion 132a based on the axis.

The tooth portion 132a of the output gear 132 may be formed in an arc shape.

The tooth portion 132a of the output gear 132 is positioned to be higher than the cam portion 132c, and a height difference between the cam portion 132c and the tooth portion 132a is formed to be equal to or larger than a thickness of the cam portion 132c.

The valve output shaft 140 positioned adjacent to the output gear 132 includes a cam portion 140c which is actuated mutually with the cam portion 132c.

In addition, the valve output shaft 140 and the cam portion 140c is formed to be equal to the thickness of the cam portion 132c of the output gear 132 or smaller than the thickness of the cam portion 132c of the output gear 132.

Accordingly, even though the valve output shaft 140 is positioned within a rotation radius of the output gear 132, the valve output shaft 140 may interfere with rotation actuation of the output gear 132.

The valve output shaft 140 is coupled to the stem 13 of the ball valve 10.

In the exemplary embodiment, the cam portion 132c of the output gear 132 and the cam portion 140c of the valve output shaft 140 constitute the selective power transmitter.

The "selective power transmitter" which is actuated to selectively transmit the rotational force of the output gear 132 to the valve output shaft 140 may include a cam portion provided in at least one of the output gear 132 and the valve output shaft 140, and may be constituted by a cam portion 132c of the output gear 132 and a cam portion 140c of the valve output shaft 140 as illustrated in FIGS. 4 to 8.

Accordingly, when the motor 120 is actuated, the driving force of the motor 120 is transmitted to the output gear 132 sequentially through the input gear 131, the first gear 133, the second gear 134, and the third gear 135, and appropriate speed reduction is made during the power transmission process.

When the valve actuator is within the normal actuation range, the cam portion 132c of the output gear 132 and the cam portion 140c of the valve output shaft 140 are maintained in contact with each other.

However, the cam portion 132c of the output gear 132 and the cam portion 140c of the valve output shaft 140 may be maintained slightly spaced apart from each other.

Here, the "normal actuation range of the valve actuator" means a state in which driving of the motor 120 is stopped and an initial state in which the motor 120 is driven in order to close the path by controlling the ball valve 10.

When the gas leakage is detected while the valve 10 is being used, a driving signal is applied to the motor 110 and the motor 110 is thus driven, and the driving force of the motor 110 is transmitted to the output gear 132 sequentially through the input gear 131, the first gear 133, the second gear 134, and the third gear 135, and as a result, the output gear 132 is rotated in a counterclockwise direction.

When the output gear 132 is rotated in the counterclockwise direction, the cam portion 132c of the output gear 132 is also rotated in the counterclockwise direction together with the output gear 132, and the rotational force of the output gear 132 is transmitted to the valve output shaft 140 through the cam portion 132c of the output gear 132 and the cam portion 140c of the valve output shaft 140.

Accordingly, the valve output shaft 140 is rotated at approximately 90 degrees in a clockwise direction, and the path of the ball valve 10 is closed due to the rotation of the valve output shaft 140.

In addition, after the valve output shaft 140 is rotated in the clockwise direction, the engagement of the cam portion 132c of the output gear 132 and the cam portion 140c of the valve output shaft 140 is released, and as a result, even though the driving of the motor 120 is not stopped, but continuously driven, the driving force of the motor 120 is not transmitted to the valve output shaft 140.

Accordingly, the motor and/or the gear assembly are/is prevented from being damaged due to the over-torque.

In addition, since the valve actuator of the present disclosure uses a cam portion having a simple structure, the durability and the driving stability of the valve actuator are secured.

In addition, since the valve actuator of the present disclosure need not include a separate electronic switch and a separate PCB for the motor stop signal, the instability of the electronic switch or the electronic sensor is removed, and the complexity and the material cost of the device are improved.

Hereinabove, the valve actuator for controlling the ball valve provided in the air conditioner has been described, but the valve actuator according to the present disclosure may be used in a valve for controlling a path of gas or a fluid.

In the above-described exemplary embodiment, it is described as an example that the "selective power transmitter" is constituted by the cam portion provided in the output gear and the cam portion provided in the valve output shaft, but the "selective power transmitter" may be constituted by a cam portion provided in any one of the output gear and the valve output shaft, and a groove portion provided in the remaining one.

When this is described, the cam portion 132c is provided in the output gear 132, and the groove portion 140d which is engaged with the cam portion 132c is provided in the valve output shaft 140.

Accordingly, in the state illustrated in FIG. 7, the cam portion 132c and the groove portion 140d are engaged, and in the state illustrated in FIG. 8, the engagement of the cam portion 132c and the groove portion 140d is released.

Unlike this, although not illustrated, it is possible that the groove portion is provided in the output gear 132, and the cam portion is also provided in the valve output shaft 140.

In addition, when the valve output shaft is rotated at 90 degrees or more, a shape of the cam may be formed in various shapes in the case of the structure in which the engagement is released.

What is claimed is:

1. A valve actuator comprising:
    a motor;
    a gear assembly comprising:
        an input gear configured to be rotated by driving force of the motor,
        an output gear configured to receive rotational force of the input gear, and
        at least one power transmission gear configured to transmit the rotational force from the input gear to the output gear;
    a valve output shaft configured to be rotated by the gear assembly to thereby open and close a valve; and
    a selective power transmitter configured to selectively transmit the rotational force from the output gear to the valve output shaft,
    wherein the at least one power transmission gear comprises a plurality of gears comprising:
        a first gear coupled to the input gear,
        a second gear coupled to the first gear, and
        a third gear coupled to each of the second gear and the output gear.

2. The valve actuator of claim 1,
    wherein the selective power transmitter comprises a cam portion that is disposed at at least one of the output gear or the valve output shaft.

3. The valve actuator of claim 2, wherein the cam portion is disposed at each of the output gear and the valve output shaft.

4. The valve actuator of claim 3, wherein the output gear comprises a tooth portion that is spaced apart from the cam portion of the output gear in a first direction, the tooth portion being disposed above the cam portion of the output gear in the first direction,
    wherein a height difference between the cam portion of the output gear and the tooth portion in the first direction is greater than or equal to a thickness of the cam portion in the first direction, and
    wherein a thickness of the valve output shaft in the first direction is less than or equal to the thickness of the cam portion of the output gear.

5. The valve actuator of claim 4, further comprising:
    a case that supports the motor, the gear assembly, and the valve output shaft.

6. The valve actuator of claim 5, wherein the motor is disposed outside the case, and the gear assembly and the valve output shaft are disposed inside the case.

7. The valve actuator of claim 1, wherein the input gear comprises a tooth portion,
    wherein the first gear comprises:
        a first tooth portion coupled to the tooth portion of the input gear, and
        a second tooth portion disposed below the first tooth portion of the first gear in a first direction,
    wherein the second gear comprises:
        a first tooth portion coupled to the second tooth portion of the first gear, and
        a second tooth portion disposed above the first tooth portion of the second gear in the first direction, and
    wherein the third gear comprises:
        a first tooth portion coupled to the second tooth portion of the second gear, and
        a second tooth portion disposed below the first tooth portion of the third gear in the first direction and coupled to the tooth portion of the output gear.

8. The valve actuator of claim 2, wherein the cam portion is disposed at any one of the output gear or the valve output shaft, and
    wherein the other one of the output gear or the valve output shaft defines a groove portion configured to couple to the cam portion.

9. The valve actuator of claim 8, wherein the output gear comprises a tooth portion that is spaced apart from the cam portion of the output gear in a first direction, the tooth portion being disposed above the cam portion of the output gear in the first direction,
    wherein a height difference between the tooth portion of the output gear and the cam portion or the groove portion of the output gear in the first direction is greater than or equal to a thickness of the cam portion or the groove portion of the output gear in the first direction, and
    wherein a thickness of the valve output shaft in the first direction is less than or equal to the thickness of the cam portion or the groove portion of the output gear in the first direction.

10. The valve actuator of claim 9, further comprising:
    a case that supports the motor, the gear assembly, and the valve output shaft.

11. The valve actuator of claim 10, wherein the motor is disposed outside the case, and the gear assembly and the valve output shaft are disposed inside the case.

12. The valve actuator of claim 11, wherein the input gear comprises a tooth portion,
    wherein the first gear comprises:
        a first tooth portion coupled to the tooth portion of the input gear; and
        a second tooth portion disposed below the first tooth portion of the first gear in the first direction,
    wherein the second gear comprises:
        a first tooth portion coupled to the second tooth portion of the first gear, and
        a second tooth portion disposed above the first tooth portion of the second gear in the first direction, and
    wherein the third gear comprises:
        a first tooth portion coupled to the second tooth portion of the second gear, and
        a second tooth portion disposed below the first tooth portion of the third gear and coupled to the tooth portion of the output gear.

13. The valve actuator of claim 2, wherein the output gear comprises a tooth portion that is disposed at a first side with respect to an axis of the output gear,
    wherein the cam portion protrudes from an inner surface of the output gear to a second side opposite to the first side with respect to the axis of the output gear, and wherein the valve output shaft defines a groove portion configured to receive the cam portion of the output gear.

14. The valve actuator of claim 13, wherein the output gear comprises a tooth portion that is spaced apart from the cam portion of the output gear in a first direction,
wherein a height difference between the tooth portion of the output gear and the cam portion of the output gear in the first direction is greater than or equal to a thickness of the cam portion of the output gear in the first direction, and
wherein a thickness of the valve output shaft in the first direction is less than or equal to the thickness of the cam portion of the output gear in the first direction.

15. The valve actuator of claim 13, wherein the valve output shaft has a ring shape, and the groove portion is recessed from a circumferential surface of the valve output shaft.

16. The valve actuator of claim 1, wherein the output gear is configured to rotate about a first axis extending in a vertical direction,
wherein the valve output shaft is configured to rotate about a second axis that is spaced apart from the first axis in a horizontal direction that is orthogonal to the vertical direction, and
wherein the selective power transmitter comprises a protrusion that extends from at at least one of the output gear or the valve output shaft in the horizontal direction, the protrusion being configured to selectably make a contact between the output gear and the valve output shaft based on rotation of the output gear.

17. The valve actuator of claim 7, wherein the tooth portion of the output gear is disposed at an opposite side of a cam portion of the output gear with respect to an axis of the output gear extending in the first direction.

18. The valve actuator of claim 12, wherein the tooth portion of the output gear is disposed at an opposite side of the cam portion or the groove portion of the output gear with respect to an axis of the output gear extending in the first direction.

* * * * *